May 29, 1956    P. C. ANDERSON ET AL    2,748,001
FEED SUPPLEMENTS FROM RUMINANTS
Filed Aug. 6, 1953
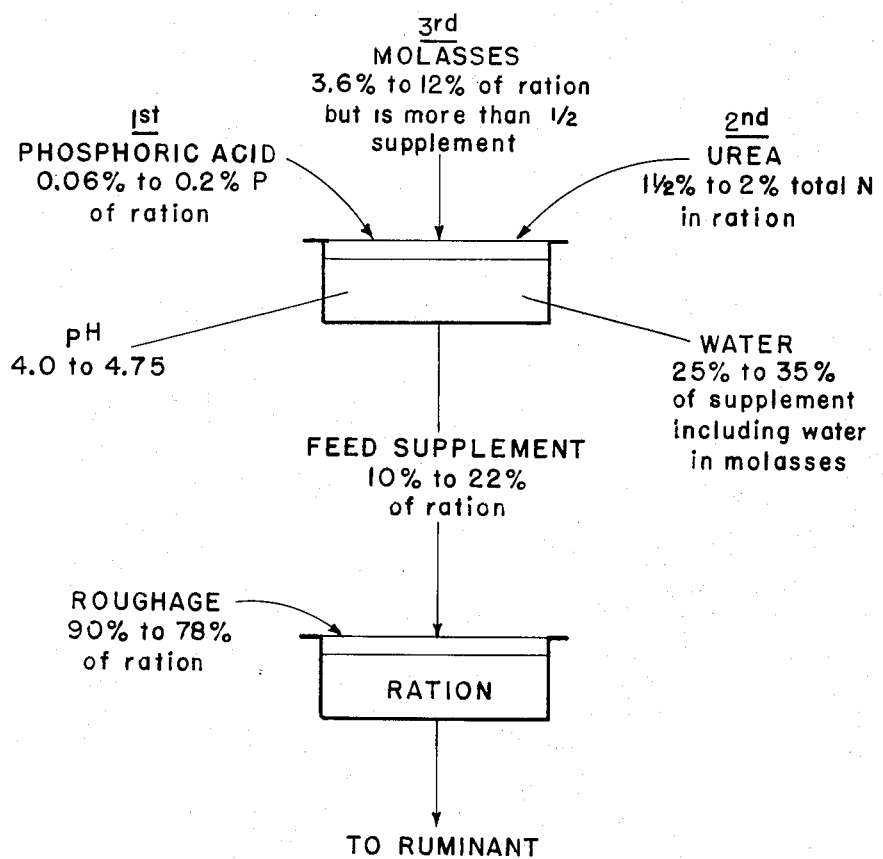
Percentages are by weight
Ruminant may eat supplement and roughage separately
INVENTORS
PHILIP C. ANDERSON
FRANK N. RAWLINGS,
BY Arthur Middleton
ATTORNEY

United States Patent Office 2,748,001
Patented May 29, 1956

2,748,001

FEED SUPPLEMENTS FOR RUMINANTS

Philip C. Anderson, Crete, Nebr., and Frank N. Rawlings, North Ogden, Utah; said Anderson assignor to Feed Service Corporation, a corporation of Nebraska Application August 6, 1953, Serial No. 372,774

2 Claims. (Cl. 99—6)

This invention relates to improvements in feeds for ruminant animals and refers more particularly to supplement constituents in feeds for such animals that increase the utilization of non-protein-nitrogen compounds such as urea by ruminant animals and their conversion into organismal protein that can be then utilized by the digestive system of the host animals. So it is an object of this invention to devise ways and means by which urea can be modified or supplemented to become assimilatable by the ruminant to be used by it for conversion into flesh and lactation to a maximum degree.

It is now well known that a ruminant derives its protein-forming food directly from micro-flora, including, for instance bacteria, yeast, protozoa, and so on, that live and propagate in the ruminant's rumen or paunch that lies in advance of the abomasum or true stomach of the animal. So it is another object of this invention to devise a supplement for the animal's food that will stimulate to a maximum degree the growth and reproduction of these micro-flora because in the true stomach, these micro-flora (which will be referred to herein for short merely as bacteria) and their excrescences are digested in that stomach and turned into flesh. Therefore, it is still another object of this invention to include in that supplement, everything that will encourage and stimulate the number and growth of such bacteria in the rumen.

In other words, this invention teaches in part that if the bacteria of the rumen have all their biologic needs satisfied to an optimum extent, the meat-and-lactation production processes of the ruminant animal will thereupon be maximized—the overall object of this invention. But those bacteria need more than merely non-protein nitrogen such as urea, for they must be given other nutrients such as soluble phosphorus, water-soluble trace minerals and water-soluble carbohydrates over and beyond the roughage that is an indispensable part of their total ration, which roughage may be broken down and made assimilatable by the bacteria. The bacteria are in effect immotile although somewhat mobile. So their food must be brought to them since they cannot go to it. And it is known that they will multiply most quickly and rapidly if they have available adequate water-soluble nutrients to supplement those nutrients which they make available to themselves by disintegration of the less soluble items of the diet of their host animals, such as roughage including grains. So it is still another object of this invention to devise such a supplement that can be imbibed by the ruminant as a liquid.

Animals of all kinds, including ruminants, have strong likes and dislikes when it comes to food, so it is yet another object of this invention to devise such a supplement that is palatable at all times to the ruminant so that the ruminant will take it by free choice in adequate amounts but without over-indulgence. As it may be some time between the mixing of the liquid supplement and its being made available to the ruminant, it must not ferment, it must not attract insects, it must not be too viscous, it must not be corrosive, and it must be substantially immune to extremes of temperature. The basic starting materials of the supplement of this invention are urea, phosphoric acid (or a phosphate), molasses, and water, with or without further additives such as trace minerals and vitamins for specific purposes. The urea in commercial form is crystalline, and it does not dissolve readily in molasses, so it is another object of this invention to devise ways for getting the urea and the phosphoric acid into solution in the molasses, and homogeneously dispersed therein. Another object of this invention is to discover the critical limits of the proportionate amounts of each of these ingredients, if there be such, and also any critical quantitative relation that may exist between the liquid supplement and the total ration of the ruminant.

These objects may be realized by a liquid supplement made by properly admixing phosphoric acid (or a phosphate) and urea, or by using an equivalent urea phosphate if such is or becomes available in water-soluble form, molasses (either beet, cane, corn hydrol, or wood) as a carbohydrate, and water in controlled amount. Additives can be used in addition as required or desired, and particularly trace minerals and vitamins such as A and C as well as the tocopherols, recalling that anything may be added that encourages and stimulates growth of micro-flora in the rumen of the host animal. However, if vitamins are used, they may have to be stabilized. Critical ratios and proportions must be observed, whereupon the invention resides both in the process of making the liquid supplement and in the supplement itself for the latter, after being made, may be dried on some carrier such as dried beet pulp or other carbohydrate feed, to be subsequently made liquid again before being offered to the ruminant animal. This can be done readily because the supplement has pronounced hygroscopic tendencies.

The phosphoric acid, or its equivalent water-soluble phosphate, is first mixed with urea in water at a temperature lying in a range of from substantially 150° F. to 170° F. whereupon after being well mixed, the mixture is mixed with molasses. An endothermic reaction takes place, so to prevent freezing, this admixing takes place at a temperature lying in a range of from substantially 60° F. to 70° F. A minimum amount of water should be used to avoid degradation of the supplement in cold weather, such as the impaired solubility of urea. The proportions or ratios to be used lie in the following ranges, taken on a weight basis:

The phosphoric acid is used in such proportions that it will supply sufficient soluble phosphorus (P) in the total ration of the animal so as to amount to from 0.06 to 0.2% of the total weight of the complete ration, namely, of the supplement plus the carbohydrate roughage eaten by the animal including all normally ruminant-edible growths such as hay, corn stalks, corn cobs, straws of all kinds, alfalfa, bagasse, seed hulls, beet tops, grains, and grain fractions. The phosphoric acid can be used in the ortho-, meta-, or pyro- forms or as phosphates, although the acid is preferable. Ordinary commercial phosphoric acid can be used having 25% content of P and 75% other constituent. The pH of the supplement must be kept in a range lying from 4.0 to 4.75. Below 4.0 the supplement becomes corrosive and unpalatable. Above 4.75, the supplement will ferment, and will attract insects.

The urea is commercial crystalline urea having approximately 46% nitrogen (N). The quantity used runs between about 2% to 20% by weight of the supplement, but the critical measure is the nitrogen content which must lie in a range of from 1½% to 2% total nitrogen in the complete ration of the animal.

The molasses used primarily as a carbohydrate must be more than half of the supplement and can be usual commercial type molasses that is about 80 Brix. and thus has 20% water so this water content must be taken into consideration when calculating the total water present in the supplement. Among other things, the molasses buffers the pH of the supplement to a point where the phosphorus in the form of phosphoric acid is palatable. The molasses content lies in a range of about 3.6% to 12% of the complete ration but since it is the least critical, it can be used to make up the remainder of the supplement so long as the supplement comprises from 10% to 22% of the total ration, which is another way of saying that of the total ration eaten by the ruminant animal the roughage ranges from 90% to 78%, while the supplement ranges conversely from 10% to 22%.

One example of the foregoing is: 75% phosphoric acid to the extent of 16 pounds was added to 62 pounds of water. 75 pounds of urea is stirred into the acid solution, whereupon 375 pounds of molasses is mixed therewith under agitation until a homogeneous composition is obtained. Here are other examples:

*Example II*

| | Pounds |
|---|---|
| Urea | 50 |
| Molasses | 400 |
| 75% phosphoric acid | 16 |
| Water | 62 |
| Copperas | 2 |
| Supplement | 530 |

*Example III* [1]

| | Pounds |
|---|---|
| Urea | 11 |
| Molasses | 439 |
| 75% phosphoric acid | 16 |
| Water | 62 |
| Copperas | 2 |
| Supplement | 530 |

*Example IV* [2]

| | Pounds |
|---|---|
| Urea | 106 |
| Molasses | 344 |
| 75% phosphoric acid | 16 |
| Water | 62 |
| Copperas | 2 |
| Supplement | 530 |

[1] To be fed with roughage of high nitrogen grasses such as spring brome grass.
[2] To be fed with roughage of low nitrogen grasses such as very mature prairie hay in the autumn season.

The copperas in these examples is mainly representative of trace minerals. Such minerals should be added in a water-soluble form because it is an essential of the supplement of this invention that it be water-soluble so as to be readily assimilatable by the bacterial micro-flora of the ruminant's rumen. Normally, in the practice of this invention, the trace mineral additives include zinc sulfate, manganese sulfate, cobalt sulfate, ferrous sulfate, and potassium iodide. The quantity used is calculated on the needs of the bacteria of the rumen, or the needs of the host animal, whichever is greater. In one specific example, about 33 grams of a mixture of these trace minerals was added to each 100 pounds of the supplement.

It is important to control the pH of the supplement to lie in a range of from 4.75 down to 4.0. These limits include those points where regardless of humidity, in the air, and regardless of exposure to the air or to sunlight, the supplement is indifferent to attack from aerobic or anaerobic fermentation micro-flora. And by thus assuring against growth or germination of such micro-flora due to excess hydrogen concentration, insects will not be attracted to the supplement. Indeed, the supplement in that range of pH actually repels insects. Below 4.0 pH the ruminant animals do not take the supplement apparently because it ceases to become palatable, and further it is too corrosive for satisfactory handling. Also, it will cause excessive urination in the ruminants.

The phosphoric acid, or perhaps it should be said that the soluble phosphorus of either the phosphoric acid used, or an equivalent phosphate, has a synergistic effect on its companion constituents and, indeed, on the effect of the supplement itself. In other words, it is a multi-purpose constituent, in its critical quantities used. It causes the supplement to be insect repellent as just described; it facilitates dissolution of the urea in the molasses; it stabilizes the supplement against fermentation prior to being consumed, especially when diluted; it inhibits the growth of undesirable yeasts and molds; it reduces viscosity or increases fluidity of the supplement so the supplement will flow at lower temperatures; it stabilizes any water-soluble vitamin added to the supplement; and the bacterial response to the soluble phosphorus is marked, so it seems to enable them to do a better job of assimilating the urea and the resultant tearing down of the roughage into simpler compounds that are readily digestible in the true stomach of the host animal. In the foregoing statement about stabilizing against fermentation, it is to be noticed that the qualifying words "prior to being consumed" have been used, because upon being consumed by the host animal, the animal's saliva immediately neutralizes the supplement to a pH range wherein the fermentation-inhibiting effect no longer prevails. Further advantages are: the supplement looks like molasses but has a bitter sour taste that is so palatable as to be sought after by ruminants; the phosphorus is available in solution and thus in a readily available form; the pH guarantees an acid condition within the ruminant's rumen as required for the efficient hydrolysis of food molecules by the microflora in the rumen; the phosphoric acid supplies a buffer action against possible alkalinosis caused by too high an intake by the ruminant of alkaline substances; it serves as a glucose preservative; it prevents flies and other insects from being attracted to the supplement and indeed they are repelled by it; it prevents fermentation of the molasses even when diluted such as by rain or snow and thus the supplement remains palatable and unchanged over a period of days, whereas molasses normally ferments when its total solids drop below 80; it prevents the formation by fermentation of substances such as lactic acid that are of no benefit to the microflora of the rumen and that also readily attract insects; it prevents the supplement from freezing or becoming viscous for regardless of temperature the supplement will flow freely from its container; it preserves vitamin additives with the result that they "live" in the supplement for many months after its manufacture, while the molasses present is an excellent medium for holding the vitamins and keeping them from both air and light that are very destructive to them; and it acts synergistically with tocopherol as an anti-oxidant that importantly protects from oxidation in the rumen the reduced carbon molecules, including vitamin A.

An animal seems to adjust his intake of the supplement to his nitrogen (or protein) needs. It seems to do this unerringly when given free choice, that is when ample roughage and ample supplement are freely available to it. Therefore, if the animal's intake of roughage is high in protein, the animal will eat less of the supplement and in this way brings his total ration to lie within the 1½% to 2% nitrogen allowance. Contrariwise, if the roughage is lower in protein, the animal will eat more of the supplement. But the general average of the consumption of the supplement by the ruminant's feeding free choice, runs close to 10% of the total ration consumed.

Heretofore, it was considered impossible to use a molasses-urea type of supplement to provide more than 35 per cent of the total nitrogen requirement of the ration, whereas it has been found that by the supplement of this invention, as much as 100 per cent of the total nitrogen requirement can be satisfied in this way, if it is so desired.

The physiology of the feeding of ruminants has been excellently described in the patent to Turner, No. 2,560,830, although the patentee seems to have missed what we have observed, namely, that instead of trying to coat the urea to make it immune to the bacterial processes in the rumen, we do everything we can to make the urea and its conjointly co-operative sister-constituents readily available to and assimilatable by the bacterial micro-flora of the rumen. Indeed, while Turner has well stated the biologic aspects of the feeding of ruminants, it is believed that he has misinterpreted the problem as well as its solution as we have now found it. For instance, he advises against the use of molasses or other such solubles, whereas we do everything we can to use solubles, and our attention is directed to the micro-flora of the rumen instead of away from it, or even from the host animal itself.

A flow-sheet drawing accompanies this specification to aid in understanding this invention. This application is a continuation-in-part of our application Serial No. 264,286, filed December 29, 1951, now abandoned.

We claim:

1. The process of making a molasses-urea-phosphoric acid feed supplement for ruminants that is free-flowing, non-fermentable, non-attractive to insects, vitamin-stabilizing, and provdes its essential nutrients in solution for the rumen's micro-organisms upon which the host animal is dependent, which comprises mixing in the presence of phosphoric acid, urea, molasses and water to form a homogeneous mixture thereof, in which mixture the molasses is in quantity more than one-half the supplement by weight, the urea is in quantity lying in a range of from 2% to 20% of the supplement by weight, the water present including water in the molasses lies in a range of from 25% to 35% of the supplement by weight, and the phosphoric acid is in quantity sufficient to provide phosphorus in a range of from 0.27% to 2.0% of the supplement by weight, whereby there is yielded a supplement so palatable to the ruminant that the ruminant by its own free choice will consume it as well as its normally-consumed roughage.

2. A feed molasses-urea-phosphoric acid liquid supplement for ruminants that is free-flowing, non fermentable, non-attractive to insects, vitamin-stabilizing, and provides its essential nutrients in solution for the rumen's micro-organisms upon which the host animal is dependent, which comprises a water solution of phosphoric acid, urea and molasses, in proportions wherein the quantity of the molasses present is more than one-half the supplement by weight, the quantity of the urea present lies in a range of from 2% to 20% of the supplement by weight, the quantity of the water present including water in the molasses lies in a range of from 25% to 35% of the supplement by weight, and the quantity of the phosphoric acid present is sufficient to provide phosphorus in a range of from 0.27% to 2.0% of the supplement by weight, whereby there is yielded a supplement so palatable to the ruminant that the ruminant by its own free choice will consume it as well as its normally-consumed roughage.

References Cited in the file of this patent

UNITED STATES PATENTS

| | | |
|---|---|---|
| 2,560,830 | Turner | July 17, 1951 |
| 2,569,282 | Block | Sept. 25, 1951 |
| 2,603,567 | Stiles | July 15, 1952 |

FOREIGN PATENTS

| | | |
|---|---|---|
| 24,038 | Great Britain | of 1896 |